(No Model.)
C. DICKENSON.
RAILROAD RAIL JOINT BOX.
No. 537,409. Patented Apr. 9, 1895.
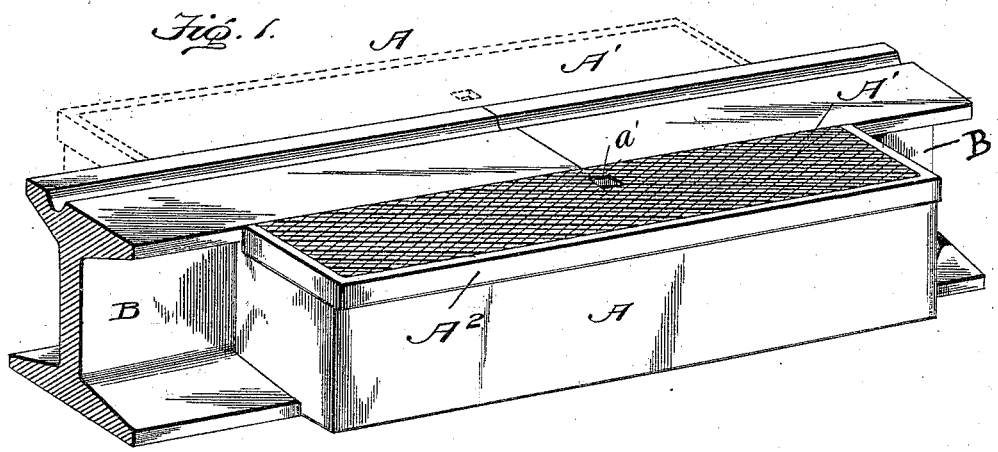
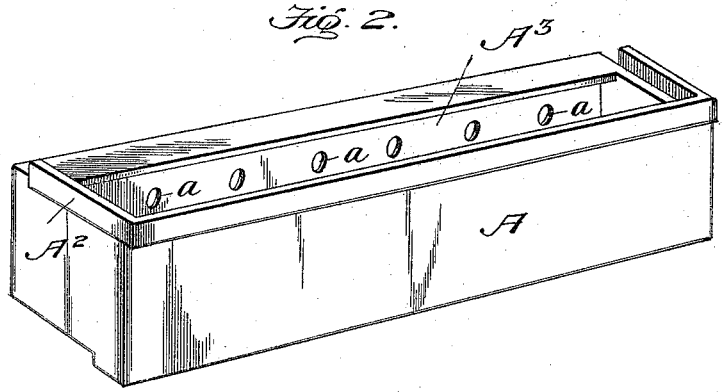
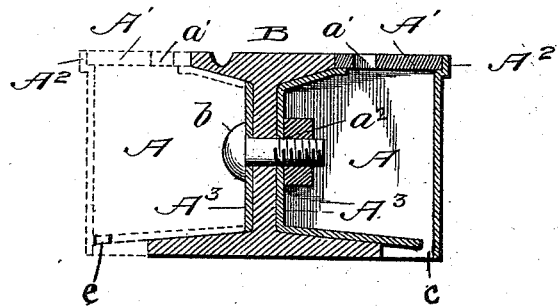
Witnesses: Inventor.
Charles Dickenson

UNITED STATES PATENT OFFICE.

CHARLES DICKENSON, OF WASHINGTON, DISTRICT OF COLUMBIA.

RAILROAD-RAIL-JOINT BOX.

SPECIFICATION forming part of Letters Patent No. 537,409, dated April 9, 1895.

Application filed August 15, 1894. Serial No. 520,354. (No model.)

*To all whom it may concern:*

Be it known that I, CHARLES DICKENSON, a citizen of the United States, residing at Washington, in the District of Columbia, have invented certain new and useful Improvements in Railroad-Rail-Joint Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to that class of traps or boxes for the rail joints of street railways wherein one side of the box or trap forms the fish-plate and the other three sides protect the nuts and bolts from the paving material, whereby ready access may be had to the track at the joints for the purpose of repairs and the object of my invention is to provide a simple, cheap and practical device of the class mentioned and more particularly for application to tracks already laid, and which may be applied thereto in the simplest manner and at a minimum of expense and to these ends the novelty consists in the construction, combination and arrangement of the same as will be hereinafter more fully described and particularly pointed out in the claims.

In the accompanying drawings the same letters of reference indicate like parts of the invention.

Figure 1, is a view in perspective of a portion of the rail joint showing my improved trap in position and showing a second trap on the opposite side of the rail-joint in dotted lines. Fig. 2, is a perspective view of the trap detached from the rail and having the lid or cover removed to show the bolt holes in one side of the trap, which forms the fish-plate and Fig. 3, is a transverse or cross section of the rail and traps on the line of one of the bolts.

Referring by letter to the drawings B B are the rails, $b$ the bolts, and $a^2$ the nuts, all of which are of the ordinary or any approved construction, it being obvious than any form of rail or bolts with lock-nuts or lock washers may be employed as I lay no claim whatever to these parts.

A is the trap proper and it consists of a rectangular cast iron box of suitable size and shape to conform to the style of rail to which it is to be applied and having the outside of one longitudinal side $A^3$ conform to the side of the rails so as to form a fish-plate, which of course is dispensed with.

$A'$ is the top or cover of the trap and it fits snugly in a rabbet, formed by the flange $A^2$ on the three sides of the trap and the flange on the tread or face of the rail. This cover is readily removed to gain access to the interior of the trap, by inserting a crow or pinch-bar in the hole $a'$ in the lid or cover and $c$ is an outlet or drain hole in the lower end of the bottom of the trap said bottom being inclined as shown in Fig. 3, for that purpose to allow any water to escape, which may have gained entrance into the trap through the hole $a'$.

In practice the device is used as follows: In laying a new line of road, one of the traps is secured to each side of the rails at each joint, as shown in Fig. 1, and the bolts inserted, nuts screwed home, the covers placed on the traps and the road is ready for paving or concreting, the surface of the pavement coming up flush with the face or tread of the rails and the level of the trap which protects the nuts and bolts from the pavement at these rail joint points.

By reference to the cross section of the trap shown in Fig. 3, it will be seen that the width of the trap is greater than the length of the bolt, so that the worn bolts may be removed and new ones inserted with great facility.

Of course it will readily be seen that the track-walker has only to insert his pinch-bar in the cover of the trap, thereby giving free access to the nuts and bolts for the purpose of tightening them up or replacing worn ones, a thing that is impossible as the roads are now constructed, as the pavement or concrete has to be torn up at every joint for a few feet to get to the bolts and nuts and this expensive work must be done, whether the bolts need setting up or replacing or not, as the cement or concrete is packed and tamped around them so closely as to prevent their examination, and another feature is that the alkali in the concrete combined with the rain rapidly rusts and corrodes the bolts and nuts, all of which is avoided by my improved trap which prevents the water and concrete material from coming in contact with the threads on the bolt or nut, a very important feature being the drain-hole or outlet c as without it in that class of boxes which are entirely inclosed the surface or rain water would fill the box and so effectually rust and ruin the nuts and bolts as to entirely defeat the objects for which it was intended, while in the bottomless form of box the greatest point of strength is taken away from the box and rails and their usefulness and life very materially diminished, the object of the fish-plate being to brace or strengthen the rails at the joints, which is accomplished in a far greater degree by my improved form of box than with the fish-plate alone or with that class of bottomless boxes one side of which forms the fish-plate or in the other class having an integral bottom and fish-plate and so entirely surrounding the nuts and bolts as to prevent the surface water from escaping, and as my improved form of box does not go below the bottom of the rail, or face of the cross tie, the simplicity in applying it to roads already constructed will readily be seen and appreciated over those forms which are combined with chairs, rail seats and lateral braces, &c., all of which are dispensed with.

In applying my improved trap to roads already constructed, it is only necessary to remove the paving or concrete from the rail joints for a suitable distance to receive the trap, then remove the fish plates, and insert the traps in lieu thereof and the object is accomplished.

Having thus fully described my invention, what I claim as new and useful, and desire to secure by Letters Patent of the United States, is—

1. The combination with the meeting ends of two railroad rails, of an open-bottom box or trap secured to the webs of the rails at the rail-joint by bolts and nuts, the nuts being located within the trap, said open-bottom trap projecting over or beyond the outer edge of the base-flange of said rails to form an opening throughout the length of the box or trap through which water may escape and thereby produce an anti-freezing rail-joint trap for railways, substantially as specified.

2. The combination with the meeting-ends of two railroad rails, of an open bottom box or trap secured to each face of the webs of the rails at the joint by bolts and nuts, the heads of the bolts and points and the securing nuts upon said points being located within the open bottom boxes or traps, at the sides of the rail-joint, substantially as specified.

In testimony whereof I affix my signature in presence of two witnesses.

CHARLES DICKENSON.

Witnesses:
H. J. ENNIS,
J. N. FANT.